(12) United States Patent
Yuting et al.

(10) Patent No.: US 11,863,541 B2
(45) Date of Patent: Jan. 2, 2024

(54) SYSTEM AND METHOD FOR END-TO-END SECURE COMMUNICATION IN DEVICE-TO-DEVICE COMMUNICATION NETWORKS

(71) Applicant: SIGNIFY HOLDING B.V., Eindhoven (NL)

(72) Inventors: Zhang Yuting, Winchester, MA (US); Jin Yu, Lexington, MA (US); Dan Jiang, Westford, MA (US); Dong Han, Newton, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 208 days.

(21) Appl. No.: 16/960,206

(22) PCT Filed: Dec. 21, 2018

(86) PCT No.: PCT/EP2018/086690
§ 371 (c)(1),
(2) Date: Jul. 6, 2020

(87) PCT Pub. No.: WO2019/134868
PCT Pub. Date: Jul. 11, 2019

(65) Prior Publication Data
US 2021/0067495 A1 Mar. 4, 2021

Related U.S. Application Data

(60) Provisional application No. 62/613,439, filed on Jan. 4, 2018.

(30) Foreign Application Priority Data

Feb. 1, 2018 (EP) ..................................... 18154579

(51) Int. Cl.
*H04L 9/40* (2022.01)
*H04W 12/0431* (2021.01)
(Continued)

(52) U.S. Cl.
CPC ........ *H04L 63/0478* (2013.01); *H04L 9/0894* (2013.01); *H04L 9/14* (2013.01);
(Continued)

(58) Field of Classification Search
CPC ............. H04L 63/0435; H04L 63/0442; H04L 63/0464; H04L 63/0478; H04L 9/0894;
(Continued)

(56) References Cited

U.S. PATENT DOCUMENTS

2005/0081039 A1* 4/2005 Lee ........................ H04L 63/123
713/176
2010/0228972 A1* 9/2010 Wat ........................ H04L 9/0833
713/168

(Continued)

OTHER PUBLICATIONS

Michael Haus, et al., "Security and Privacy in Device-To-Device (D2D) Communication: A Review," IEEE Communications Surveys & Tutorials, vol. 19, No. 2, Second Quarter 2017 (26 Pages).
(Continued)

*Primary Examiner* — Jason K Gee
*Assistant Examiner* — Brian William Avery

(57) ABSTRACT

A system and method for enabling secure device-to-device (D2D) communication between a plurality of user devices. The method includes providing public and private keys for each of the user devices, the private key arranged to decrypt data encrypted by the corresponding public key. A sender user device creates a digital signature using its private key. The sender double-encrypts a transmission using both the public keys of a recipient user device and a first relay user device. The transmission is transmitted from the sender to the recipient through a plurality of relay user devices. Each relay user device receives the transmission, decrypts a first layer of encryption with its private key, encrypts the transmission with the public key of a subsequent user device; and forwards the data transmission to the subsequent user
(Continued)

device. The recipient authenticates the digital signature of the sender using the public key of the sender.

13 Claims, 13 Drawing Sheets

(51) Int. Cl.
*H04L 9/08* (2006.01)
*H04L 9/14* (2006.01)
*H04L 9/30* (2006.01)
*H04L 9/32* (2006.01)
*H04L 9/00* (2022.01)

(52) U.S. Cl.
CPC .......... *H04L 9/3073* (2013.01); *H04L 9/3247* (2013.01); *H04L 63/0435* (2013.01); *H04L 63/0442* (2013.01); *H04W 12/0431* (2021.01); *H04L 9/50* (2022.05)

(58) Field of Classification Search
CPC ....... H04L 9/14; H04L 9/3073; H04L 9/3247; H04L 2209/38; H04W 12/03; H04W 12/04031; H04W 12/0431; H04W 4/80; H04W 4/00; H04W 76/14
See application file for complete search history.

(56) References Cited

U.S. PATENT DOCUMENTS

| | | | |
|---|---|---|---|
| 2014/0119544 A1 | 5/2014 | Lee | |
| 2015/0074414 A1* | 3/2015 | Kim | H04L 9/3263 713/176 |
| 2016/0065362 A1* | 3/2016 | Choyi | H04L 63/065 380/279 |
| 2016/0255502 A1 | 9/2016 | Rajadurai et al. | |
| 2016/0269185 A1 | 9/2016 | Stojanovski et al. | |
| 2016/0295496 A1 | 10/2016 | Atarius et al. | |
| 2017/0223519 A1 | 8/2017 | Agiwal et al. | |
| 2018/0115895 A1* | 4/2018 | Lehtovirta | H04W 8/005 |
| 2018/0316495 A1* | 11/2018 | Wall | H04L 9/3073 |
| 2018/0351757 A1* | 12/2018 | Reddy | H04L 12/1822 |

OTHER PUBLICATIONS

Mingjun Wang, et al., "Security in D2D Communications: A Review," 2015 IEEE TRUSTCOM/BIGDATASE/ISPA (6 Pages).

"3rd Generation Partnership Project; Technical Specification Group Services and System Aspects; Study on Security Issues to Support Proximity Services (PROSE) (Release 13)," 3GPP Standard, Technical Report 2017 (227 Pages).

KPN: "Rear-Discussion on PC5 Security," 3GPP Draft, 3rd Generation Partnership Project 2018 (2 Pages).

\* cited by examiner

SYSTEM AND METHOD FOR END-TO-END SECURE COMMUNICATION IN DEVICE-TO-DEVICE COMMUNICATION NETWORKS

CROSS-REFERENCE TO PRIOR APPLICATIONS

This application is the U.S. National Phase application under 35 U.S.C. § 371 of International Application No. PCT/EP2018/086690, filed on Dec. 21, 2018, which claims the benefit of U.S. Provisional Patent Application No. 62/613,439, filed on Jan. 4, 2018 and European Patent Application No. 18154579.9, filed on Feb. 1, 2018. These applications are hereby incorporated by reference herein.

FIELD OF THE INVENTION

The present disclosure is directed generally to systems and methods for providing end-to-end secure communication in device-to-device (D2D) communication networks.

BACKGROUND

Consumers have been benefiting from constant advances in cellular communication technologies in terms of speed, reliability, functionality, coverage, etc. However, new technologies bring new risks, particularly as identity and data theft poses a real and increasing threat, which must be addressed as these technologies are implemented. Device-to-device (D2D) communication over cellular networks is one such advancing technology, but it also exposes the user devices enabled for D2D communication (alternatively, "user equipment" or "UE") to new security threats.

More specifically, cellular D2D communication is an emerging type of wireless technology that enables devices to communicate directly without fixed or centralized network infrastructure such as access points or base stations. Unlike other D2D technologies, such as Bluetooth, WiFi-Direct, or Near Field Communication (NFC), which operate on unlicensed spectrum, cellular D2D communication is developed as a controlled or constrained underlay network working on the same spectrum as cellular networks utilizing existing communication standards such as LTE-Advanced (LTE-A), among others.

Some standards for implementing D2D communications have been established. For example, FIG. 1 illustrates LTE standards for a D2D communication system architecture proposed by the 3$^{rd}$ Generation Partnership Project (3GPP), which is generally understood by those in the mobile telephony industry and will not be described herein in detail. However, of particular note, it is to be appreciated that D2D communication occurs over the interface PC5.

Existing systems do not provide sufficient levels of security in various situations, such as in a partial-coverage or out-of-coverage scenarios (i.e., at least some, or all, devices are not within the communication range of a base station or other network infrastructure), since it is more difficult to authenticate legitimate users from malicious users that may attempt to make attacks in direct communications to other UEs, such as by creating fake identities, eavesdropping, impersonation, data interception, user manipulation, and privacy invasion. Also, existing systems do not address security in "multi-hop" scenarios in which data must be relayed through a plurality of intermediary user devices. Security cannot be guaranteed in such multi-hop scenarios because the intermediary relay user devices may attempt to intercept and retrieve the data instead of passing it through to the intended recipient undisturbed.

Accordingly, there is a continued need in the art for methods and systems that increase the security of communications in emerging technologies, particularly in D2D communication networks that include a plurality of user devices.

SUMMARY OF THE INVENTION

The present disclosure is directed to inventive methods and systems for ensuring end-to-end secure communications in device-to-device communication networks. Various embodiments and implementations herein are directed to a communication system that includes a plurality of user devices that desire to engage in D2D communication. The user devices include a key application module that is associated with a proximity service application of each user device. The key application module of each user device manages an asymmetric pair of public and private encryption keys ("keys") for that user device, while the proximity service application enables the user devices to detect other user devices and engage in D2D communications. Two user devices may begin communications by authenticating themselves in an authentication processes in which a first (sender) user devices uses its private key to create a digital signature, and the public key of the second (recipient) user device to encrypt a transmission (or "data"). The second (recipient) user device can use its own private key to decrypt the transmission and the public key of the first (sender) user device to verify the digital signature.

Designated network components may include a proximity service function and a proximity service application server that assist in registering the user devices to a particular network and facilitating D2D communication between the user devices when one or more of the user devices are within network coverage with these components. A key server module may also be included to assist in generating, storing, assigning, and/or managing the public and private keys.

One or more user devices may act as a relay if the sending and recipient user devices cannot directly detect each other, but one or more other user devices can. In the event that multiple relays are necessary, then in addition to the aforementioned authentication, the sender user device may double-encrypt the transmission with both the public key of the receiving or recipient device and the public key of the first relay user device. The first relay device can then decrypt the first layer of encryption and re-encrypt the transmission with the public key of the subsequent relay user device. This process of decrypting one layer of double encryption then again double encrypting can continue with each pair of adjacent relay user devices in a chain until the transmission reaches the desired recipient or recipient user device, which can decrypt the original layer of encryption using its private key.

The currently disclosed embodiments address security threats by use of a key application module and a key server module that manage asymmetric security using a pair of public and private keys for each user device to authenticate end-to-end communication and encrypt end-to-end transmission, to prevent any malicious eavesdropping, identity fabrication and user manipulation. The key server module and key application module can assign differential security and sensitivity levels that restrict the scope of protection offered to varying levels of private information in data transmission to protect privacy in D2D communications.

Generally, in one aspect, a method of conducting end-to-end secure device-to-device (D2D) communication between a plurality of user devices is included. The plurality of user devices includes a sender user device, a recipient user device, and a plurality of relay user devices. The method includes the steps of providing a public key and a private key for each of the user devices, the private key for each user device arranged to decrypt data encrypted by the public key corresponding to that private key; creating, by the sender user device, a digital signature using its private key; double-encrypting, by the sender user device, a data transmission using the public key of the recipient user device and the public key of a first one of the relay user devices, the data transmission including the digital signature; transmitting the data transmission in a chain from the sender user device to the recipient user device through the plurality of relay user devices starting with the first one of the relay user devices, wherein, for each of the relay user devices, the step of transmitting includes: receiving the data transmission; decrypting a first layer of encryption of the data transmission with its private key; encrypting the data transmission with the public key of a subsequent one of the user devices in the chain; and forwarding the data transmission to the subsequent one of the user devices; authenticating, by the recipient user device, the digital signature of the sender user device using the public key of the sender user device; and conducting D2D communications between the sender user device and the recipient user device if the digital signature is authenticated.

According to an embodiment, the method further includes providing a wireless communication network with a base station; registering the user devices with a proximity service application server when the user devices are in communication with the proximity service application server over the wireless network; and managing the public keys, the private keys, or both with a key server module in communication with the proximity service application server.

According to an embodiment, the step of managing includes generating the public keys, generating the private keys, or both. According to an embodiment, the step of managing includes storing the public keys in memory and providing the public keys to the user devices or the proximity service application server upon request, and either not storing the private keys or not sharing the private keys if the private keys are stored by key server module.

According to an embodiment, at least one of the user devices is not connected to the wireless network during the step of transmitting. According to a further embodiment, none of the user devices are connected to the wireless network during the step of transmitting. According to an embodiment, at least one of the user devices is associated with a plurality of pairs of the public and private keys, each pair associated with a different level of desired security. According to a further embodiment, the different levels of desired security are associated with different applications installed on the user device, with different intended recipients of the transmitted data, or a combination including at least one of the foregoing.

According to an embodiment, the step of conducting further includes negotiating, with the sender and recipient user devices, a symmetric secret key that is less complex than the public keys of the sender and recipient user devices for reducing computational power required to decrypt the D2D communication.

A system for enabling end-to-end secure device-to-device (D2D) communication is also provided according to one aspect. The system includes a plurality of user devices that includes a sender user device, a recipient user device, and a plurality of relay user devices, each user device having: a proximity service application (14) configured to detect others of the user devices and to enable D2D communications between the user devices; and a key application module (18) in communication with the proximity service application and configured to manage a public key and a private key for each user device, the private key for each user device arranged to decrypt data encrypted by the public key corresponding to that private key; wherein the user devices are configured to enable D2D communication between the sender user device and the recipient user device via a chain that includes the plurality of relay user devices; wherein the sender user device is configured to double-encrypt a data transmission with the public key of the recipient user device and with the public key of a first one of the relay user devices, the data transmission including the digital signature of the sender user device, wherein each relay user device is configured to: decrypt a first layer of encryption from the data transmission using its private key when the data transmission is received, encrypt the data transmission with the public key of a subsequent one of the user devices in the chain, and forward the data transmission to the subsequent one of the user devices in the chain, and wherein the recipient user device configured to decrypt the data transmission using its private key and to verify authenticity of the digital signature using the public key of the sender user device.

In one embodiment, the user devices are mobile communication devices communicating over a cellular communication network. In one embodiment, the key application modules are arranged to generate the public and private keys. In one embodiment, each user device is associated with a plurality of pairs of the public and private keys, each pair associated with a different level of desired security.

In one embodiment, the system further includes: a base station (16) configured to produce a wireless network for the plurality of user devices; a proximity service application server (20) configured to register user devices connected to the wireless network; and a key server module (24) in communication with the proximity service application server and configured to manage the public keys, the private keys, or both. In one embodiment, at least one of the user devices is not in communication with the base station.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks, e.g., cellular networks, suitable for interconnecting multiple devices, e.g., mobile phones, may include any of a variety of network topologies and employ any of a variety of communication protocols. Furthermore, it should be readily appreciated that various networks of devices as discussed herein may employ one or more wireless, wire/cable, and/or fiber optic links to facilitate information transport throughout portions of the network, as applicable.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments and implementations herein are directed to a communication system that includes a plurality of user devices that desire to engage in D2D communication. The user devices include a key application module that is associated with a proximity service application of each user device. The key application module of each user device manages an asymmetric pair of public and private encryption keys ("keys") for that user device, while the proximity service application enables the user devices to detect other user devices and engage in D2D communications. Two user devices may begin communications by authenticating themselves in an authentication processes in which a first (sender) user devices uses its private key to create a digital signature, and the public key of the second (recipient) user device to encrypt a transmission (or "data"). The second (recipient) user device can use its own private key to decrypt the transmission and the public key of the first (sender) user device to verify the digital signature.

Designated network components may include a proximity service function and a proximity service application server that assist in registering the user devices to a particular network and facilitating D2D communication between the user devices when one or more of the user devices are within network coverage with these components. A key server module may also be included to assist in generating, storing, assigning, and/or managing the public and private keys.

One or more user devices may act as a relay if the sending and recipient user devices cannot directly detect each other, but one or more other user devices can. In the event that multiple relays are necessary, then in addition to the aforementioned authentication, the sender user device may double-encrypt the transmission with both the public key of the receiving or recipient device and the public key of the first relay user device. The first relay device can then decrypt the first layer of encryption and re-encrypt the transmission with the public key of the subsequent relay user device. This process of decrypting one layer of double encryption then again double encrypting can continue with each pair of adjacent relay user devices in a chain until the transmission reaches the desired recipient or recipient user device, which can decrypt the original layer of encryption using its private key.

This invention disclosure describes a system and methods that manage asymmetric security ProSe Key generation, registration, and distribution, implements secure communication establishment between UEs for all in-coverage, partial-coverage, and out-of-coverage scenarios, and also the scenarios which need network relay service. Besides, the security of UE mobility and differential privacy are addressed.

Figure 2:
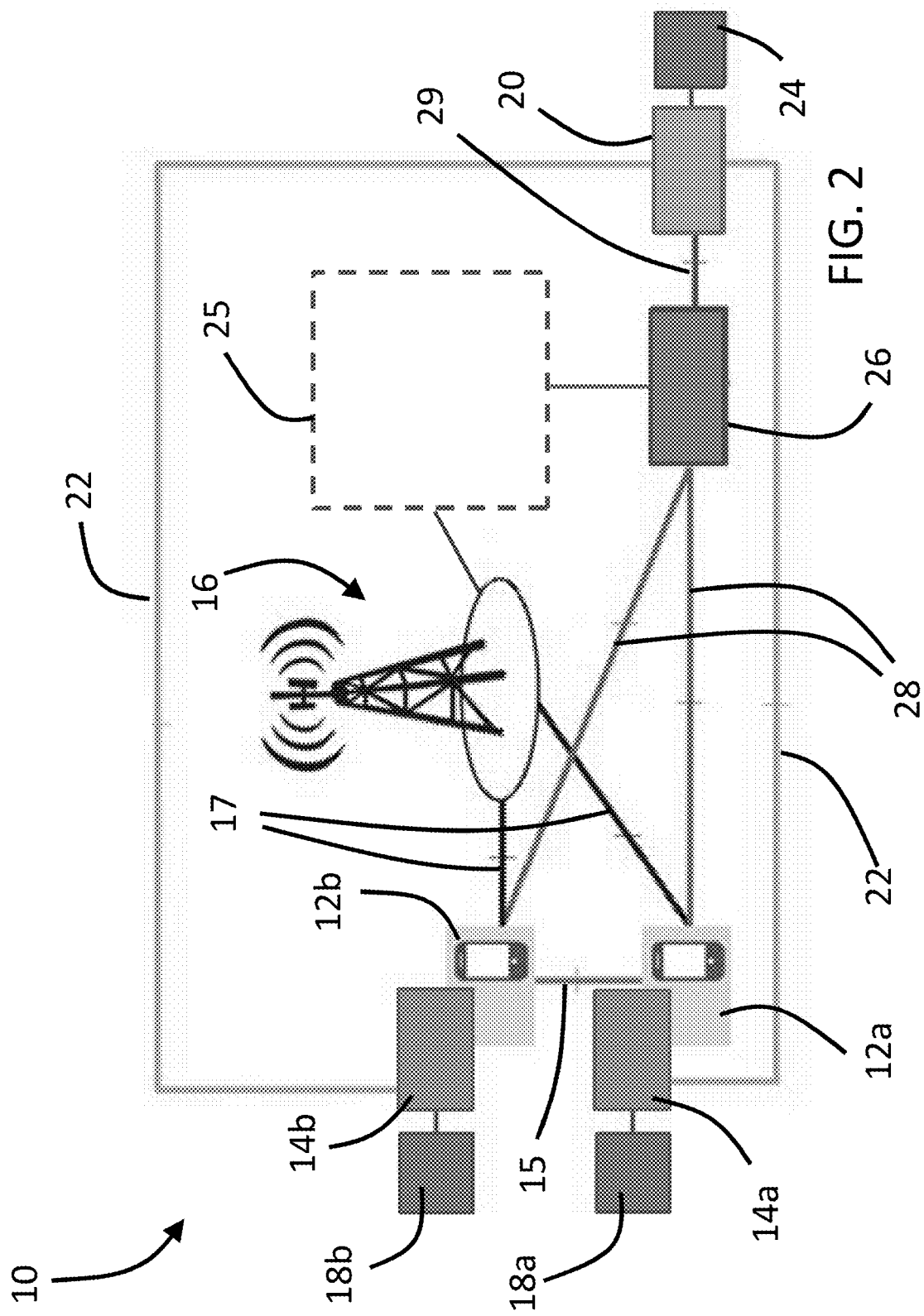
FIG. 2 is a schematic view of a D2D communication system according to one embodiment disclosed herein.

Referring to FIG. 2, in one embodiment, a device to device (or "D2D") communication system 10 is provided to enable direct communication between a plurality of user devices, two of which are illustrated and designated with reference numerals 12a and 12b. The D2D communication may include any type of data transmission including voice calls, video calls, text messaging, file sharing, etc. It is to be appreciated that any number of user devices may be in communication and that any disclosure herein to "each user device 12" or "the user devices 12" is generally applicable to both of the user devices 12a and 12b, as well as to any additional user devices in communication therewith. It is to be appreciated that similar alphabetic suffixes (e.g., "a" and "b") may be used to refer to specific instances of other components of the system 10 and/or the user devices 12. The user devices 12 may interchangeably be referred to as "user equipment" or "UE". The user devices 12 may take the form of any piece of consumer, commercial, client, or personal equipment, such as a cellphone, tablet, or other handheld computing device, as well as communication-enabled devices such as automobiles, or systems such as smart cities, connected lighting systems, and the internet of things. Those of ordinary skill in the art will recognize other implementations in view of the embodiments disclosed herein.

Each user device 12 includes a proximity service application 14 (designated individually with reference numerals 14a and 14b for the user devices 12a and 12b, respectively), which enables the user devices 12 to detect and communicate with each other directly over a communication link 15. The user devices 12 may also be in communication with designated network infrastructure, such as a base station 16, and therefore on a network provided by the base station 16. When within the communication range of the base station 16 (i.e., when joined to the network provided by the base station 16), the user devices 12 may communicate with the base station 16 via a connection link 17 (e.g., the interface Uu if implemented in accordance with the 3GPP architecture of FIG. 1).

Figure 1:
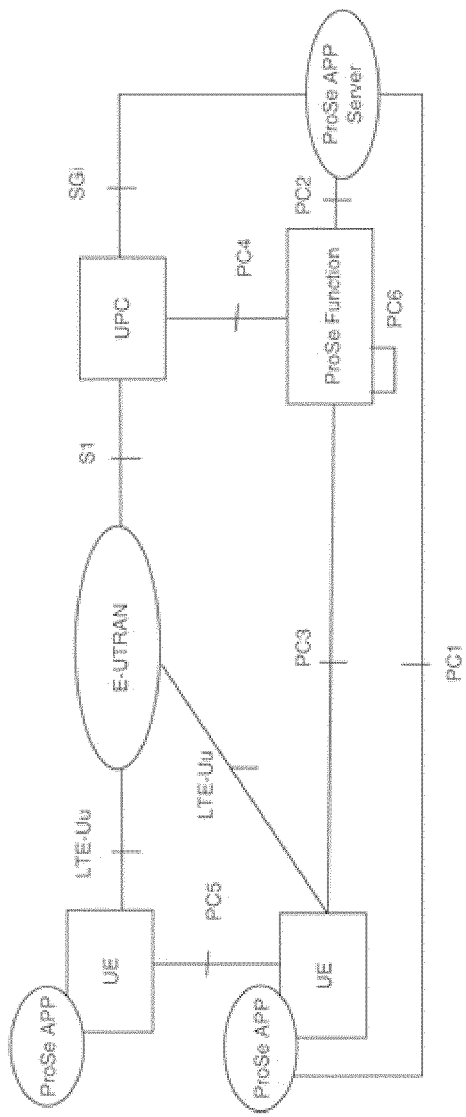
FIG. 1 illustrates a known architecture for a D2D communication system.

It should be recognized that the communication system 10 may be implemented according to any communication standards, protocols, and/or architectures, such as, but not limited to, the architecture specified by 3GPP and illustrated in FIG. 1. For example, the base station 16 may correspond to an evolved universal mobile telecommunications system terrestrial radio access network (E-UTRAN) or employ any other known or discovered mobile communication technologies. It should be appreciated that if the system 10 is implemented utilizing the general layout and terminology of the 3GPP architecture as a basic starting point, functional and/or structural aspects of the system 10 may resemble those of FIG. 1, e.g., the proximity service application 14 and the communication link 15 may in some respects generally resemble or be comparable to the ProSe App and the interface PC5, respectively, of FIG. 1, and thus a detailed description of such aspects is not included herein but will nevertheless be appreciated by those of ordinary skill in the art.

Each of the user devices 12 includes a key application module 18 (designated individually with reference numerals 18a and 18b for the user devices 12a and 12b, respectively). The key application modules 18 manage a private key and a public key for each user device 12 in order to implement transmission encryption and authentication according to asymmetric cryptology. By "asymmetric cryptology" it is meant a cryptographic system that uses a public key, which is knowable to any device, in order to encrypt data in a format that cannot be decrypted without the corresponding private key, which is privately known to only one or more select devices, notably, the recipient of the encrypted data. The key application modules 18 are implemented as software or programming code (and associated hardware to run the software) and can be either embedded into the proximity service applications 14 or accessible to the proximity service applications 14 via an application programming interface (API) or other software interface. Data encrypted by the public key can only be decrypted by the corresponding private key. In one embodiment, data encrypted by the private key can only be decrypted by the public key.

The communication system 10 includes a proximity service application server 20 (e.g., akin to the ProSe App Server). The proximity application server 20 may be arranged to assist in the registration of the user devices 12 via communication over a communication interface or link 22 (e.g., akin to PC1 of the 3GPP architecture of FIG. 1). For example, registration of the user devices 12 may trigger, enable, or authorize the proximity service applications 14 to operate in the manner described above, i.e., to enable the user devices 12 to detect and communicate with each other.

A key server module 24 is included to manage and maintain the registration and distribution of the private and public keys for each of the user devices 12 that are registered to the communication system 10. It is to be appreciated that the proximity service application server 20 and/or the key server module 24 may be locally implemented on designated infrastructure (e.g., a base station or the like) for a particular network or accessed remotely (e.g., reside in the cloud). In one embodiment, the key server module 24 is formed as part of the proximity application server 20, but in any event is in data communication with the proximity application server 20.

The key server module 24 is in communication with the proximity service application server 20 such that the private and public keys can be generated, assigned, and/or shared when the respective user device 12 registers with the proximity service application server 20. For example, during the registration of one of the user devices 12 to the communication system 10 according to one embodiment, the proximity service application 14 on the user device 12 sends a registration request to the proximity service application server 20. The proximity service application server 20 replies to the registration response and signals the key server module 24 to initiate the process of generating and/or assigning the relevant public and private keys for the user device 12 making the request.

It is to be appreciated that the system 10 may optionally include additional features and components, e.g., in order to enable compatibility with currently used communication network systems, such as the 3GPP architecture illustrated in FIG. 1. For example, the system 10 may include a packet core 25, which enables functionality similar to the UPC of the 3GPP architecture. For example, the packet core 25 may include a home subscriber server, a mobility management entity, gateways such as serving gateways and/or packet data network gateways, etc. Those of ordinary skill in the art will recognize these and other components or features that may be implemented.

The communication system 10 may also include a proximity service function 26. The proximity service function 26 may in some respects generally resemble the ProSe Function of the 3GPP architecture. For example, the proximity service function 26 may be in communication with the user devices 12 utilizing a communication link 28 (e.g., comparable to the interface PC3 if in accordance with the 3GPP architecture of FIG. 1). In the event that different ones of the user devices 12 are registered to different networks, then the proximity function 26, the proximity service application server 20, and/or the key server module 24 may be implemented by a plurality of such components that are associated with each of the different networks but in communication with each other.

For example, in one embodiment the user device 12a is registered to a different network operator and is roaming to the network to which the user device 12b is registered. The user device 12a in this embodiment may have initially performed its key registration process through a unique proximity service function than the proximity service function used by the user device 12b. For example, each of the user devices 12a and 12b may correspond to its own "home" proximity service function. When a user device is roaming in a different network, it can still contact the "local" proximity service function of the network on which it is roaming as described above. Since the user device is roaming, it may either need to register to this network, e.g., as a guest, or the "local" proximity service function may contact the roaming user devices' "home" proximity service function with which the roaming user device is already registered.

The proximity service function 26 may additionally or alternatively be in communication with the packet core 25 (e.g., via a communication link comparable to the interface PC4), and with the proximity service application server 20 via a communication link 29 (e.g., comparable to the interface PC2 if in accordance with the 3GPP architecture of FIG. 1). However, the proximity service function 26 may additionally be configured to assist in operation of, and communication between, other components of the communication system 10 as will be appreciated in view of the disclosure herein. For example, the proximity service application server 20 may communicate directly with the proximity service applications 14 of the user devices 12 over the communication link 22 or indirectly to the user devices 12 through the proximity service function 26 via the communication links 28 and 29.

Figure 3B:
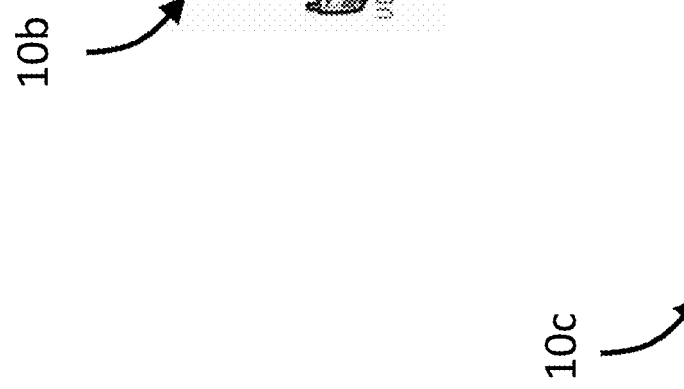
FIGS. 3A-3C schematically illustrate various D2D communication configurations for any of the D2D communication systems disclosed herein.
Figure 3C:
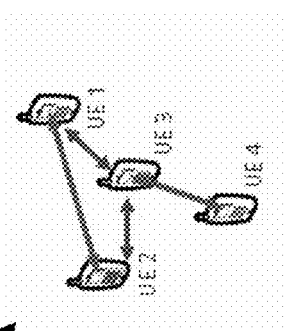
Figure 3A:
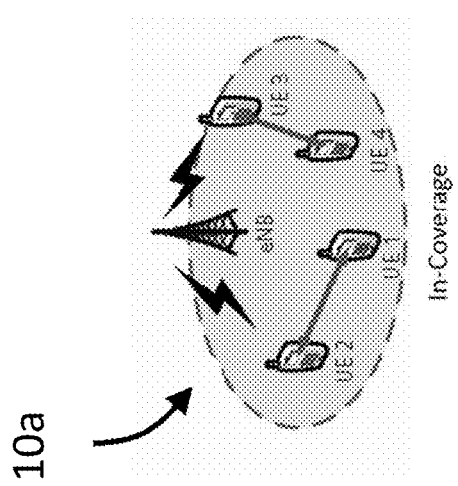

FIGS. 3A-3C provide three different scenarios in which a communication system, e.g., the system 10, can be implemented for enabling D2D communications between user devices (e.g., the user devices 12a and 12b). Accordingly, the configurations of FIGS. 3A-3C are designated with reference numerals 10a, 10b, and 10c, respectively. These three configurations include in-coverage (the configuration 10a in FIG. 3A), partial coverage (the configuration 10b in FIG. 3B), and out of coverage (the configuration 10c in FIG. 3C). It is to be understood that the user devices of FIGS. 3A-3C (i.e., UE1-UE4) may be implemented according to any of the various embodiments disclosed for the user devices 12 and vice-versa, as well as with respect to any other user devices disclosed herein. Arrows in FIGS. 3A-3C represent a D2D communication link or interface, such as the communication link 15 or the interface PC5.

FIG. 3A illustrates an in-coverage D2D communication configuration 10a in which a plurality of user devices (e.g., the user devices 12) are identified as UE1, UE2, UE3, and UE4 and are all within a communication range (designated by the encircled area) of a base station or other network infrastructure (e.g., the base station 16) identified in this embodiment as Evolved Node B or eNB (although it is to be understood that other network technologies may be utilized). Since all of the user devices UE1-UE4 are in network coverage, D2D communication is enabled amongst all of the devices and also between each of the devices and the base station.

In the D2D communication configuration 10b FIG. 3B, the user devices UE1 and UE3 are within the communication range of the base station eNB, while the user devices UE2 and UE4 are outside of the communication range, such that device UE1 can communicate directly with any other device, but each of the other devices can only communicate with the user device UE1. Both UE1 and UE3 can communicate with the base station eNB. Since some of the user devices are within network coverage and others are not, this is referred to as partial-coverage.

In the D2D communication configuration 10c of FIG. 3C, none of the user devices are in communication with a base station, hence this configuration is referred to as out-of-coverage. However, all of the devices UE1-UE4 are in direct communication with each other utilizing any of the D2D communication embodiments disclosed herein.

Figure 4A:
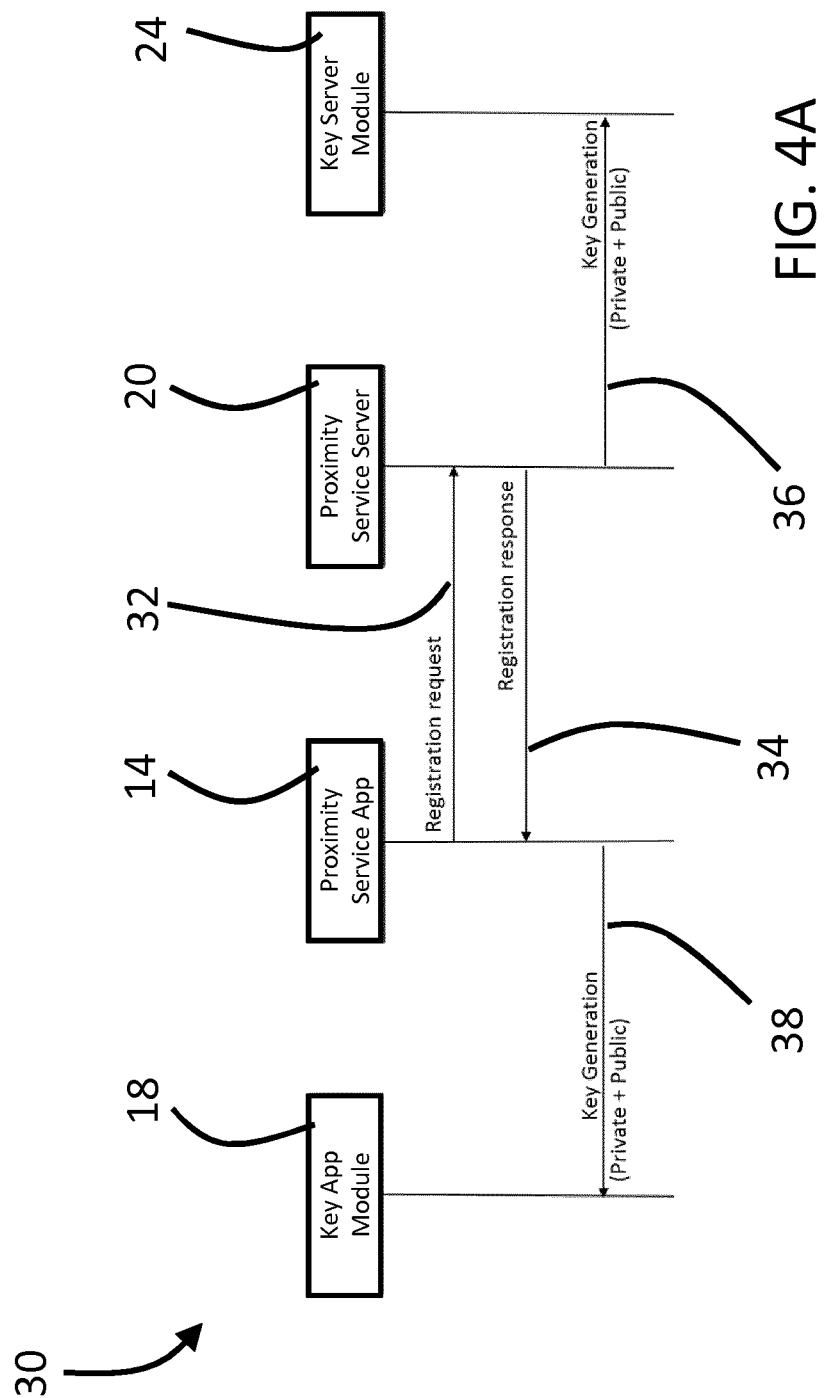
FIGS. 4A-4C schematically illustrate methods for implementing public and private key generation for the system of FIG. 2.
Figure 4B:
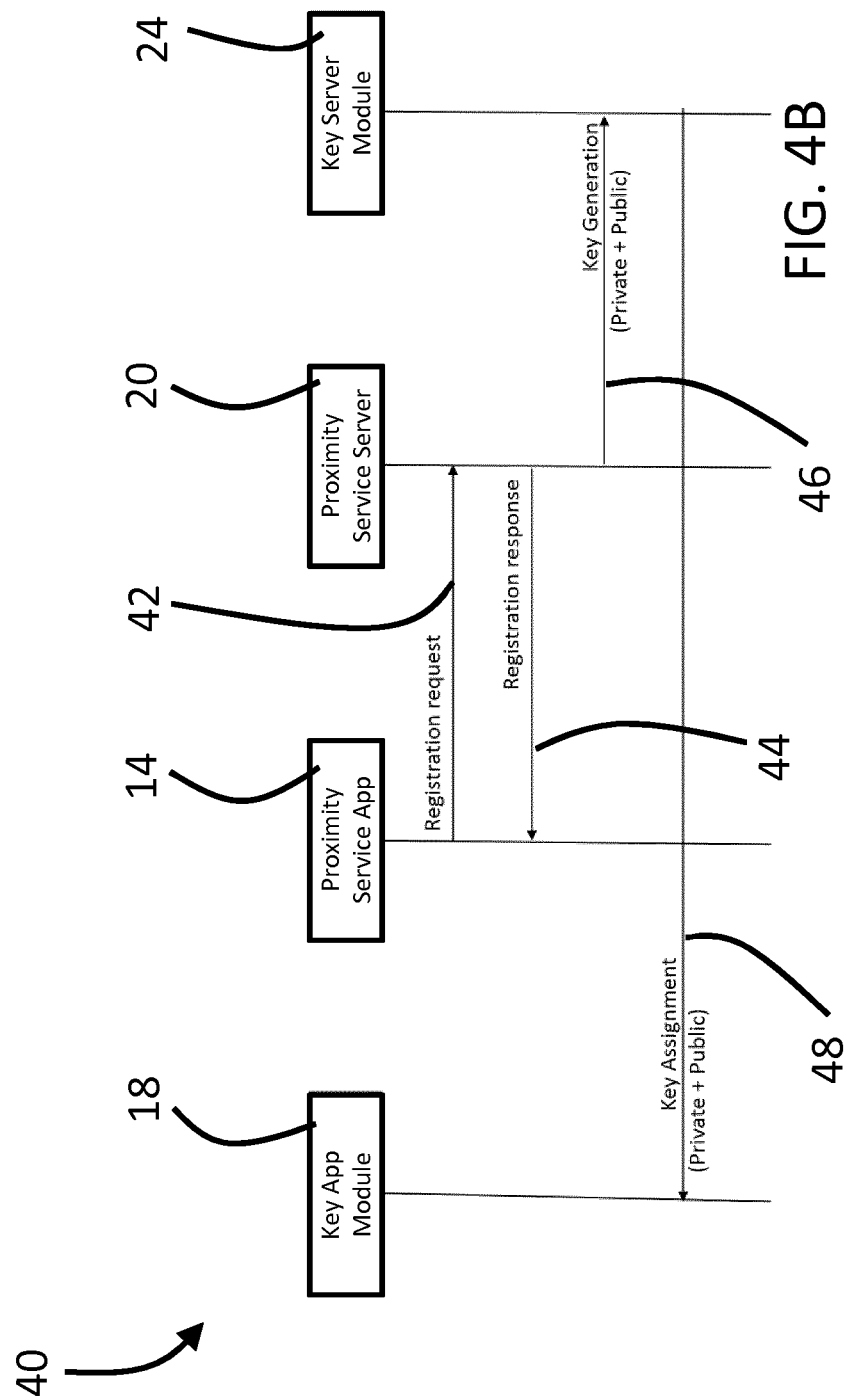
Figure 4C:
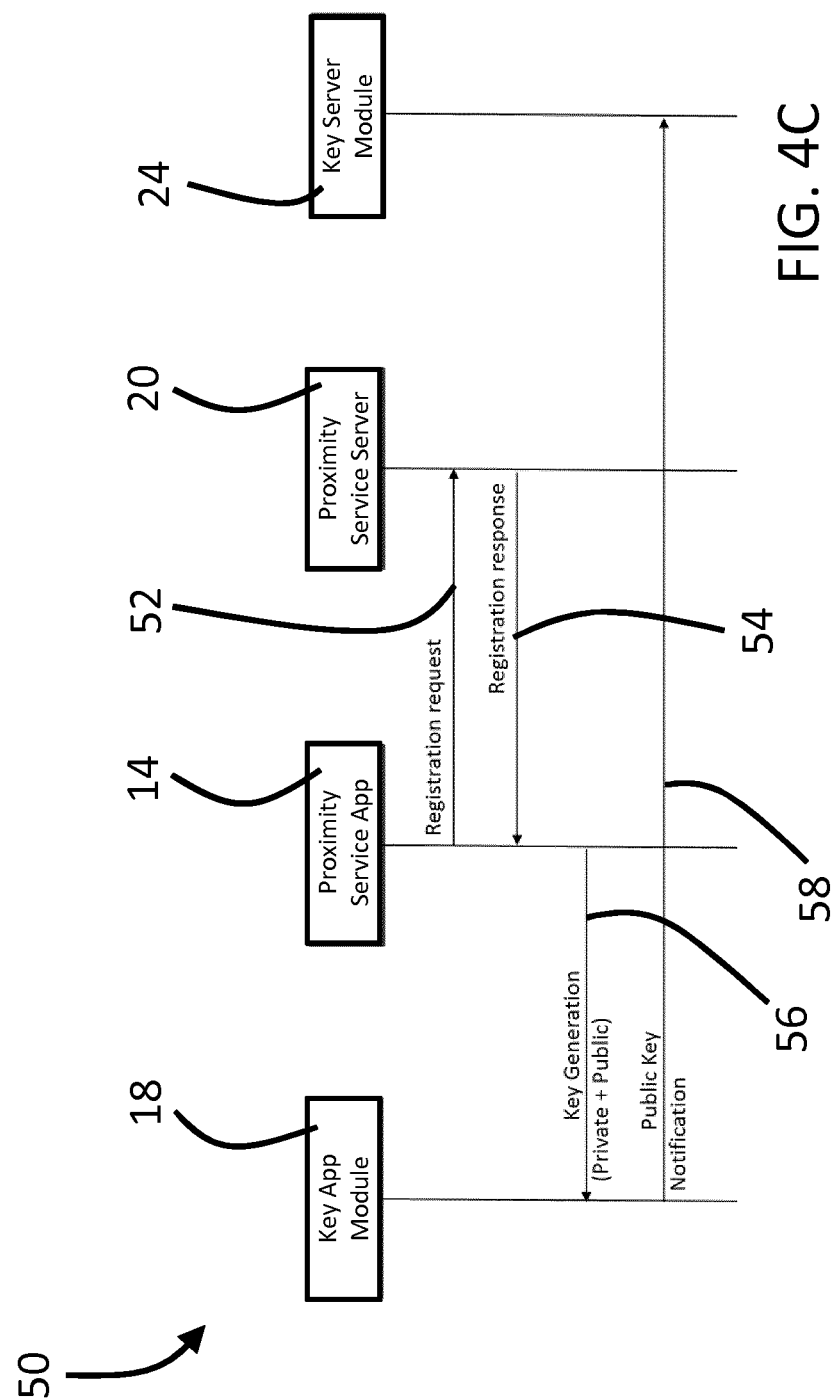

FIGS. 4A-4C illustrate three different approaches according to which the key generation process may be implemented. A method 30 is illustrated in FIG. 4A, in which the key application modules 18 and the key server module 24 are both programmed to be aware of the same key generation/assignment mechanism, e.g., the same software implemented algorithm. According to the method 30, the proximity service application 14 first requests registration from the proximity service application server 20 at a step 32. At a step 34, the proximity service application server 20 responds to the registration request with a unique set of parameters. Using the same key generation mechanism (e.g., algorithm) and the same parameters (provided at the step 34), the key application module 18 at the corresponding one of the user devices 12 (e.g., the key application module 18a for the user device 12a) generates a private key and a public key specific to that user device 12 at a step 36. Since the key generation mechanism and the parameters are known by the key server module 24, the key server module 24 can generate the same set of private and public keys for that user device at a step 38.

According to the method 30, the pair of public and private keys is managed separately at both the user side (e.g., the key application modules 18) and at the server side (e.g., the key server module 24) for authentication and encryption in D2D communications. The proximity service application server 20 and/or the key server module 24 may be configured to publically share the public keys corresponding to each of the user devices 12 (e.g., so that other devices can use the public keys to encrypt data intended to be received by the user device corresponding to each public key), but will not share or communicate the private keys.

A method 40 is illustrated in FIG. 4B, in which the key generation mechanism resides only at the server side (i.e., the key application module 18 is not configured with an algorithm or other means with which to generate keys). In the method 44, the proximity service application 14 first requests registration from the proximity service application server 20 at a step 42 (which generally resembles the step 32). At a step 44, the proximity service application server 20 responds to the registration request, e.g., with a confirmation or other data or information related to the registration of that user device. However, unlike the step 34, unique parameters do not need to be communicated in the step 44 since components of the user side 32 (e.g., the key application module 18) are not configured to generate keys with the parameters.

Once the registration process is completed at the proximity service application server 20 in the step 44, the proximity service application server 20 notifies the key server module 24 to generate a pair of private and public keys in a step 46 (which generally resembles the step 36). However, the method 40 does not include a step that resembles the step 38 of the method 30 since the key application modules 18 are not configured to generate their own keys in the method 40. Accordingly, in a step 48, the key server module 24 can then assign the private and public keys to the proximity service applications 14 and/or the key application module 18 via the communication link 22 or to the user device 12 by the assistance of the proximity services function 26 via the communication links 28 and 29.

A third approach is exemplified as a method 50 in FIG. 4C, in which the key generation process resides solely at the user side (i.e., the key server module 24 is not configured with an algorithm or other means with which to generate keys). The method starts with a step 52, which generally resembles the steps 32 and 42 of the methods 30 and 40, in which the proximity service application 14 requests registration of its corresponding user devices 12. The proximity service application server 20 then responds to the request in a step 54 that is similar to the step 44. When the proximity service application 14 receives the registration response from the proximity service application server 20 in the step 44, it signals the key application module 18 to generate the private and public keys corresponding to that user device in a step 46. The key application module 18 then sends the public key to the key server module 24 in a step 48. By this approach, the key server module 24 is unaware of the private keys of the user devices 12. However, in one embodiment, the private key is also communicated to the key server module 24, e.g., to facilitate recovery of the private key in the event that the user device is lost, damaged, reformatted, etc.

Figure 5:
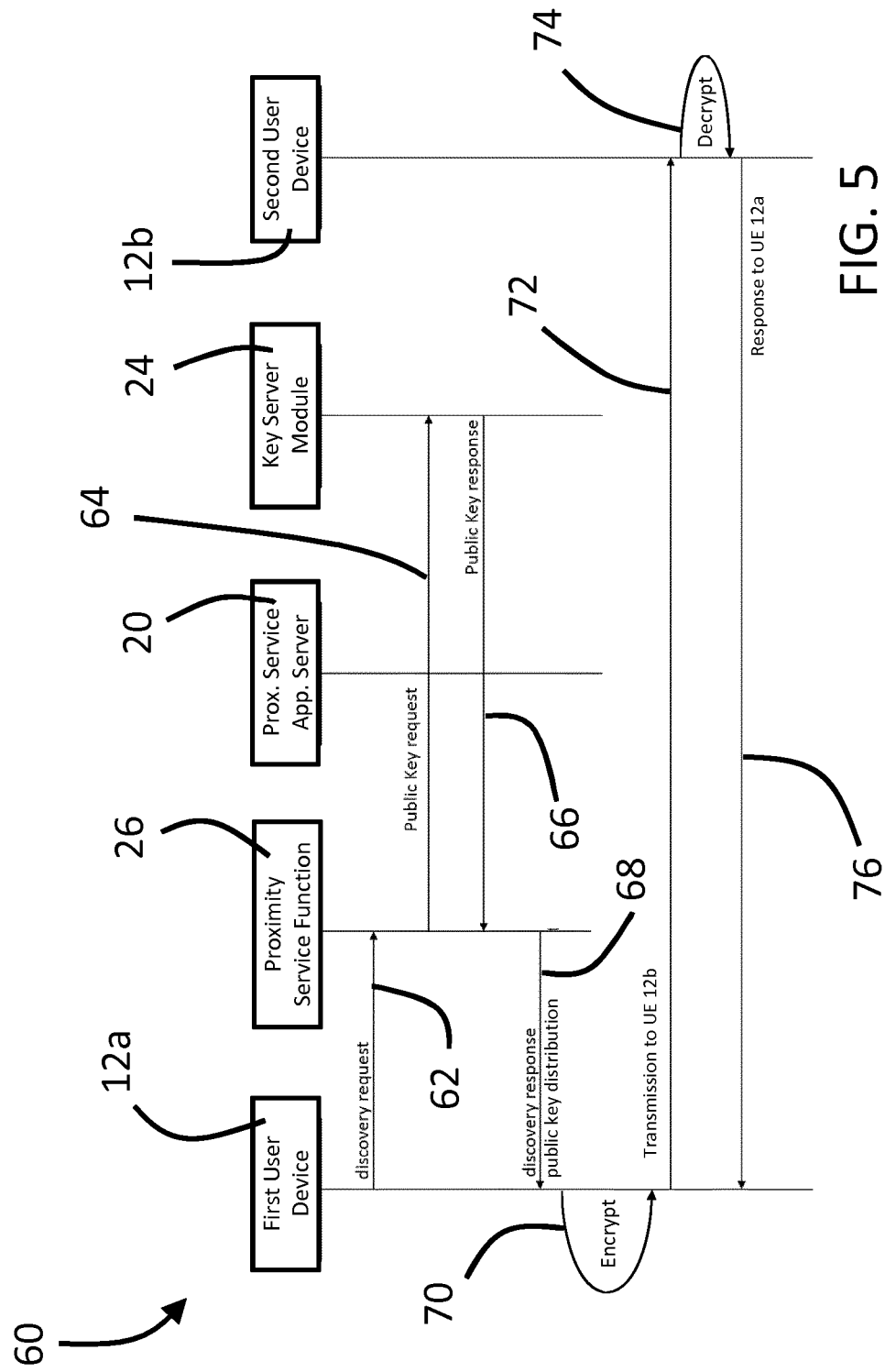
FIG. 5 schematically illustrates a method of operating a D2D communication system such as shown in FIG. 2 in accordance with an in-coverage scenario such as shown in FIG. 3A.

FIG. 5 illustrates a method 60 for executing end-to-end D2D communications in an in-coverage scenario, such as that shown in the scenario 10a in FIG. 3A. In the method 60, the first user device user device 12a requests to establish secure D2D communication with the second user device 12b. Again, it is to be understood that the user devices 12a and 12b used in this example could alternatively be, or referred to as, any pair of user devices that are in-coverage and desire direct communication, such as UE1 and UE2 in FIG. 3A, or UE3 and UE4 in FIG. 3A, or UE1 and UE3 in FIG. 3B.

In order to initiate communication, the first user device 12a uses its proximity service application 14a to send a device discovery request to the proximity service function 26 via the communication link 28 at a step 62. If both of the user devices 12a and 12b have been registered (e.g., according to any of the methods 30, 40, or 50), then the proximity service function 26 can use information from the registration process (e.g., a serial number or the like associated with the user devices 12a and 12b) to identify both the user device 12a (which is making the request), and the user device 12b (which is being requested for communication). The proximity service function 26 checks the proximity of the user device 12b and requests the public key of the user device 12b from the key server module 24 at a step 64.

The key server module 24 responds to the proximity service function 26 at a step 66 with the public key of the user device 12b, which is in turn distributed to the user device 12a at a step 68. As mentioned above, it should be appreciated that the distribution of the public key to the user device 12a could happen directly from the proximity services application 20 to the proximity service application 14a via the communication link 22 instead of indirectly through the proximity service function 26 over the communication links 28 and 29. The proximity service function 26 may at this stage also allocate spectrum and time resources for enabling the D2D communication between user devices 12a and 12b. Thereafter, at a step 70, the key application module 18a of the user device 12a can encrypt its transmission using the public key of the user device 12b that the user device 12a received in the step 68. The encrypted data is next sent to the user device 12b at a step 72. The user device 12b can decrypt the encrypted transmission using its private key at a step 74.

The user device 12b may respond at a step 76. If the user device 12b responds, it can encrypt its transmission with its own private key in order for decryption by its public key, which is already known to the user device 12a. Alternatively, the method 60 can essentially repeat from the step 62, but with the user device 12b taking the place of the user device 12a, in order for the user device 12b to encrypt transmissions to the user device 12a with the public key of the user device 12a (which must be decrypted by the user device 12a using its private key). In another embodiment, the user device 12a can send its own public key in its transmission to the user device 12b.

Figure 6:
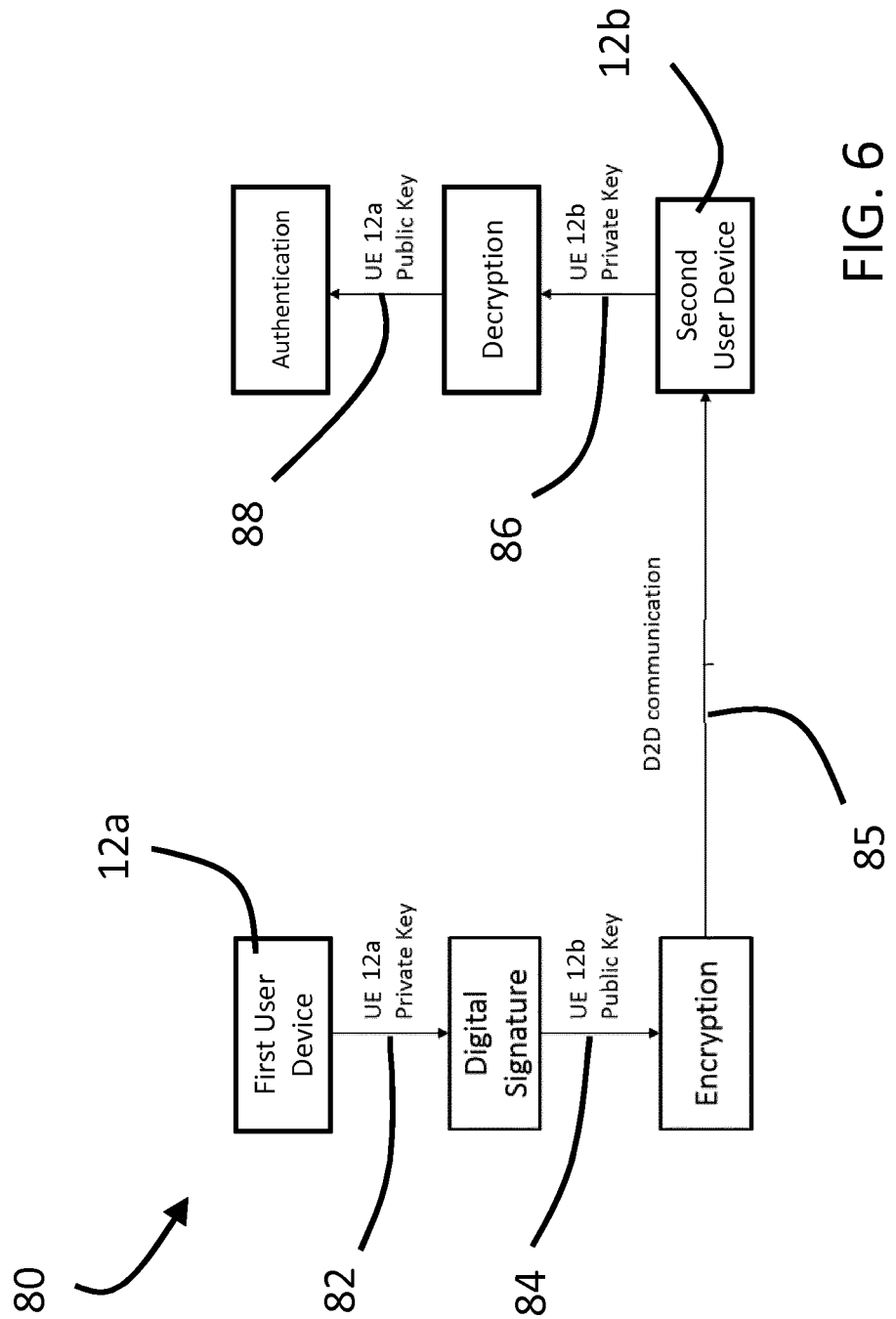
FIG. 6 schematically illustrates a method of authenticating user devices for enhanced security in D2D communication.

FIG. 6 illustrates a method 80 that embodies an authentication process for enhancing security in D2D communications. In this way, the method 80 may be used to carry out, or otherwise supplement, the steps 70-76. In the method 80, it is assumed that the user devices 12a and 12b have each other's public keys (e.g., provided directly by each other, via the proximity service function 26 as described with respect to the steps 62-68, retrieved from memory following past communications between these devices, etc.). In this way, each user device 12 has its own private key and the public key of the counterpart device (i.e., the user device 12a has its private key and the public key of the user device 12b, while the user device 12b has its private key and the public key of the user device 12a).

In a step 82, the user device 12a encrypts data using its own private key to create a digital signature that is unique to the user device 12a and accompanies its transmission. In a step 84, the user device 12a encrypts data using the public key of the user device 12b. The data encrypted in steps 82 and 84 could be the same data (such that it is double encrypted) or different data (e.g., a message intended for the device 12b encrypted with the public key of the user device 12b and a relatively small-size datum that is encrypted by the private key of the user device 12a to create the digital signature). In other words, various portions of the data could be encrypted to different levels, i.e., just by the public key of the user device 12b, just by the private key of the user device 12a, or by both of these keys. After being encrypted in the step 84, the data is then transmitted to the user device 12b at a step 85 (e.g., over the communication link 15 and/or the interface PC5).

After the user device 12b receives the data in the step 85, decryption begins at a step 86 in which the user device 12b uses its own private key to decrypt the data (or the relevant portion of the data) that was encrypted in the step 84. In order to authenticate the origin of the data, the second user device 12b uses the public key 12a to verify that the data was indeed signed by the first user device 12a at the step 82. In this way, the data is securely transmitted to its intended recipient (user device 12b) and the identity of the sender (user device 12a) is authenticated to frustrate any attempts any eavesdropping, identity fabrication, or manipulation. Similarly, the user device 12b can take the place of the user device 12a and apply the security authentication according to the method 80 to securely respond to the user device 12a.

In the event that it is desired or necessary to reduce or restrict processing and/or computation power, then after establishment of secure and authenticated communication according to the method 80, the user devices can alternatively agree on a symmetric secret key unique to their communications and use this symmetric secret key to encrypt and decrypt in lieu of continuing to perform the double encryption of the steps 82 and 84. That is, such a symmetric secret key can be shorter than the asymmetric public and private keys and thus less complicated to encrypt and decrypt for reduced computation and power requirements. In this embodiment, one of the user devices 12 may send the secret key by applying its digital signature and encryption by the public key of the other user device. Only the other user device can decrypt the message using its own private key, so no other party can intercept and decrypt the message even if it has the public keys of both of the user devices 12a and 12b.

Methods for enabling secure end-to-end D2D communication in a partial-coverage scenario, such as shown in FIG. 3B, are also disclosed herein. In the case of partial-coverage, at least one of the devices is as an out-of-coverage or remote user device (e.g., UE2 in FIG. 3B) and at least one other device is an in-coverage device (e.g., UE1 in FIG. 3B). In this way, the in-coverage device may act as (and be referred to as) a relay user device for the remote user device. For example, the remote device (e.g., UE2 in FIG. 3B) does not have direct access to the cellular or other network coverage provided by the eNB or other base station. However, by D2D communication can be used between the relay user device (e.g., UE1 in FIG. 3B) and the remote user device (e.g., UE2 in FIG. 3B) to effectively extend the network coverage to the remote device by acting as an intermediary between the base station and the remote device. The relay user device (e.g., UE1 in FIG. 3B) also enables communication between a remote user device (e.g., UE2 in FIG. 3B) and other remote user devices (e.g., UE4 in FIG. 3B), or other in-coverage user devices (e.g., UE3 in FIG. 3B).

End-to-end secure D2D communication can be established between the remote user device and the relay user device in a variety of ways. In a first embodiment, D2D communication is initially requested by the relay user device in a process that is similar to the method 60, where relay user device is in the role of the first user device 12a and the remote user device is in the role of the second user device 12b. In this example, it is assumed that the remote user device has previously registered to the network such that the key server 24 already has the public key of the remote user device. Once the communication link is established, the relay user device can send its public key to the remote user device. As noted above, the relay and remote user devices can further implement security authentication in accordance to the method 80 for enhanced security. Likewise, the relay and remote user devices can negotiate a common symmetric secret key for maintaining secure communications with reduced resource consumption as discussed above.

Figure 7:
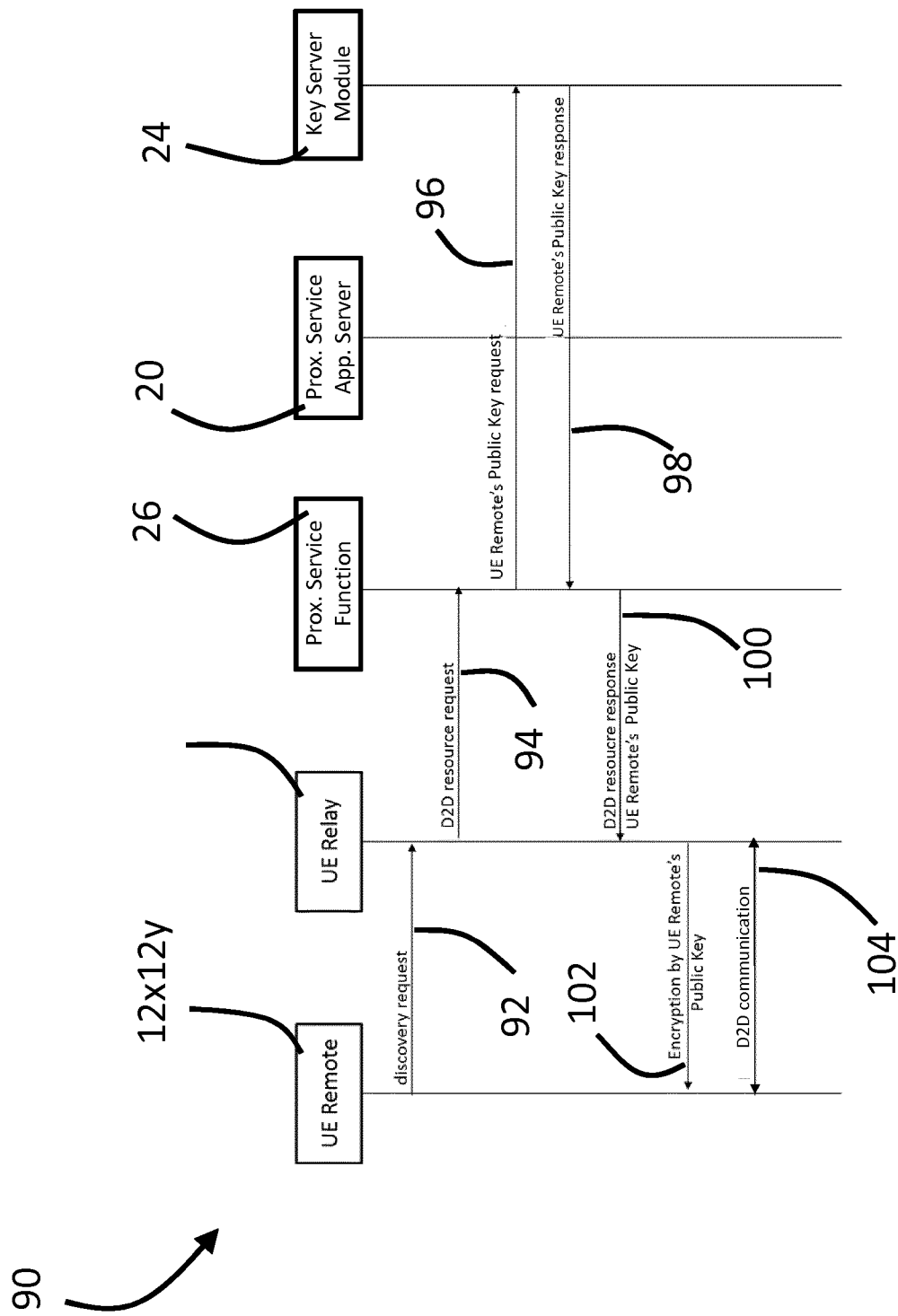
FIG. 7 schematically illustrates a method of operating a D2D communication system, such as shown in FIG. 2, in accordance with a partial-coverage scenario, such as shown in FIG. 3B.

In one embodiment, D2D communication is requested by the remote user device, which does not have access to the proximity service application server 20, the key server module 24, or the proximity service function 26. FIG. 7 provides a method 90 for enabling secure D2D communication in this scenario. The remote user device, designated with the reference numeral 12x in FIG. 7, can probe the relay user device, designated with the reference numeral 12y, with an initial discovery request at a step 92. Then the relay user device 12y requests D2D resources through the proximity service function 26 at a step 94.

The proximity service function 26 requests the public key of the remote user device 12x from the key server module 24 at a step 96, which request is granted in a step 98. The proximity service function 26 then allocates resources and provides the public key of the remote user device 12x to relay user device 12y at a step 100. The response by the relay user device 12y to the remote user device 12x can be encrypted using the public key of the remote user device 12x and transmitted to the remote user device 12x at a step 102. The remote user device 12x can decrypt the transmission using its own private key. Once the communication is established, the remote user device 12x and the relay user device 12y can communicate at a step 104 by implementing the authentication process according to the method 80 for enhanced security, and/or by negotiating a common symmetric secret key for reduced resource consumption as described above.

Various embodiments of relay assisted secure D2D communication in a partial-coverage situation can be appreciated in view of FIG. 3B. For example, in one embodiment a first user device desires to communicate with a second user device but the user devices are neither in the network range of a base station nor in range for direct communication with each other. For example, consider UE2 and UE4 in FIG. 3B, which must rely upon UE1 as a relay. In another embodiment, the first user device is a remote device that desires to communicate with the second user device, which is in network coverage of a base station, but not in range for direct D2D communication with the remote first user device. For example, consider UE2 and UE3 in FIG. 3B, which also must rely upon UE1 as a relay.

In these relay-enabled embodiments, the method 90 may be modified by having the remote user device 12x in a step akin to the step 92 also sending a discovery request to the relay user device 12y to inquire whether the relay user device 12y can detect the second user device 12b (e.g., over the communication link 15, the interface PC5, etc.). If yes, then the method continues similar to the steps 94 and 96 but with the relay user device 12y requesting public keys of both the remote user device 12x and the second user device 12b via the proximity service function 26, the proximity service application server 20, and/or the key server module 24. A response to the relay user device 12y is generated akin to the steps 98 and/or 100, but with the public keys of both the second user device 12b and the remote user device 12x, which are then forwarded to the remote user device 12x in the step 102. The method 90 can also be adapted to forward these public keys to the second user device 12b, e.g., either via the relay user device 12y if the second user device 12b is out of coverage, or via the proximity service function 26 if the second user device 12b is in-coverage. Thereafter, the relay user device 12y can authenticate both the remote user device 12x and the second user device 12b according to the method 80 and act as an intermediary to relay communications between these user devices. Those of ordinary skill in the art will appreciate that the embodiments of FIGS. 9 and 10, which pertain to out-of-coverage scenarios, are nevertheless generally applicable here, and to any D2D communication in which one or more relay user devices are required.

Methods for establishing end-to-end secure D2D communication in out-of-coverage scenarios, such as shown in FIG. 3C, are also disclosed herein. In the out-of-coverage scenario, the base station (e.g., the base station 16 and/or the eNB) are not reachable to any user device, thus the proximity service application server 20, the key server 24, and the proximity service function 26 are also inaccessible. The process of establishing secure connections in an out-of-coverage scenario may vary depending on the number of user devices participating in the communication, as described below.

Figure 8:
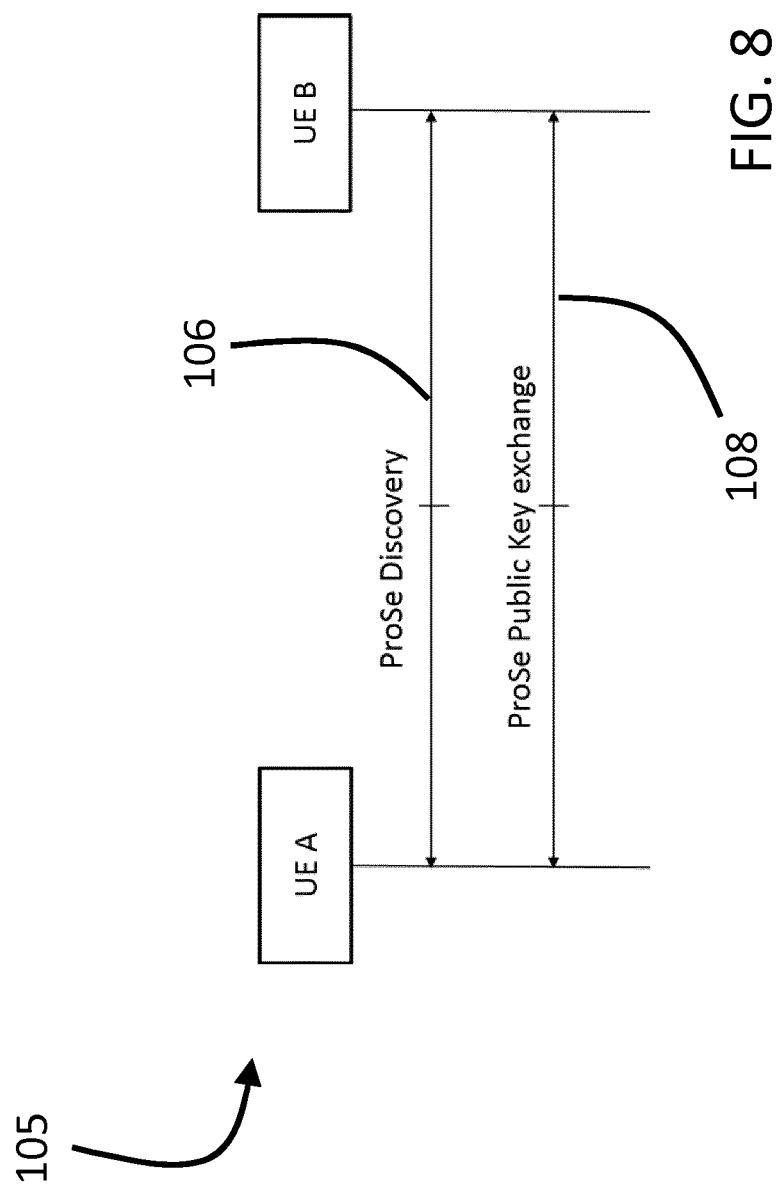
FIG. 8 schematically illustrates a method of initiating secure D2D communication in a D2D communication, such as shown in FIG. 2, in accordance with an out-of-coverage scenario, such as shown in FIG. 3C.

A method 105 is provided in one embodiment illustrated in FIG. 8, in which a D2D link can be established directly between two user devices (i.e., the user devices can detect and reach each other in their respective radio range). As shown in the method 105 the first and second user devices, designated as UE A and UE B in this example, discover each other by their respective proximity service applications 14a and 14b over the communication link 15 at a step 106. UE A and UE B can exchange their own public keys at a step 108, as managed by their respective key application modules 18a and 18b. Next, UE A and UE B can apply the authentication in accordance with the method 80 to establish a secure D2D communication link. Afterwards, UE A and UE B can negotiate a common symmetric secret key to reduce power/computational resources, if desired, as discussed above.

Figure 9:
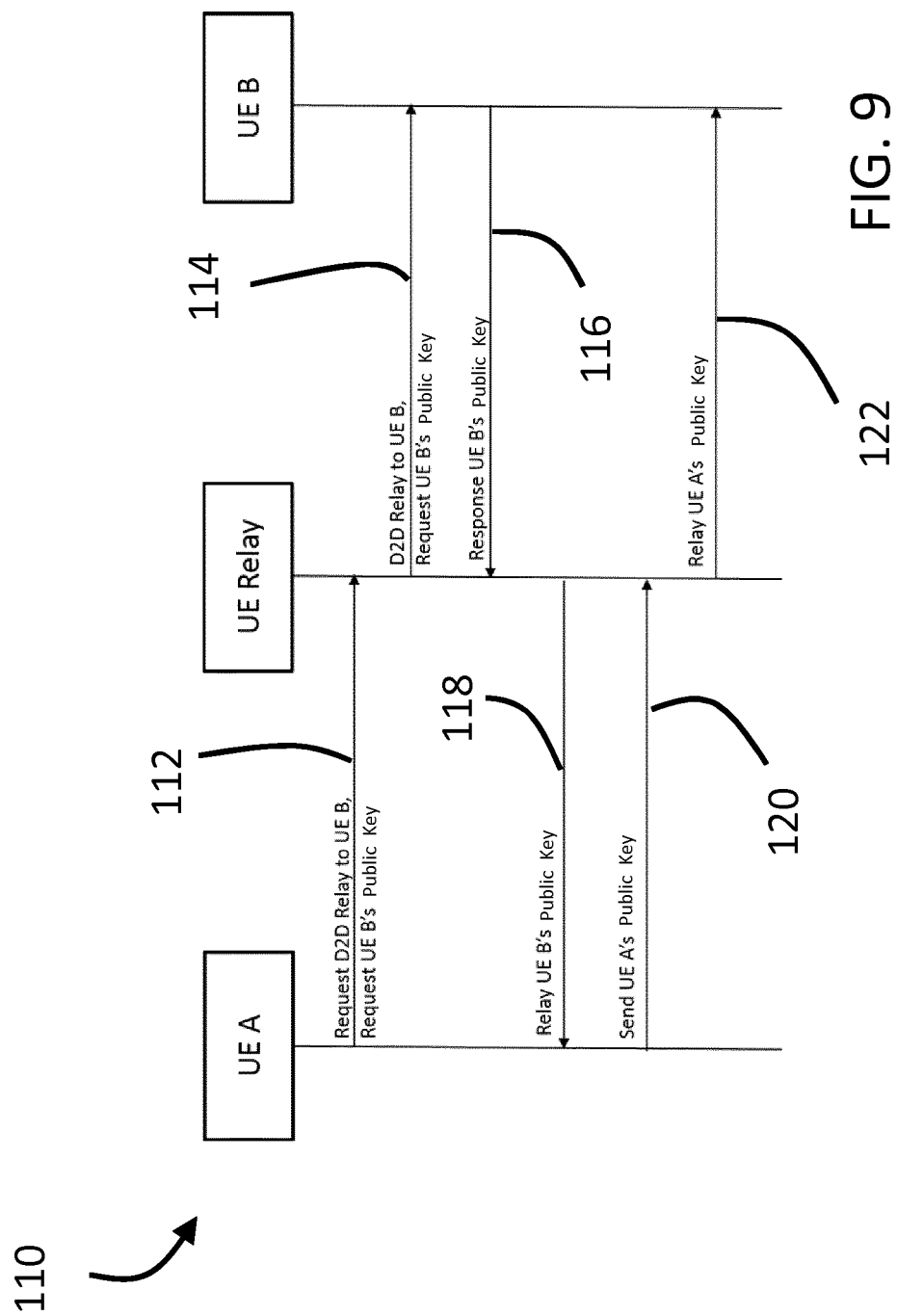
FIG. 9 schematically illustrates a method of using a relay user device to facilitate indirect D2D communication in a communication system, such as the system of FIG. 2.

A method 110 providing relay-assisted D2D communication between two user devices is illustrated in FIG. 9. In this embodiment, a first user device UE A (e.g., the user device 12a), desires to communicate with a second user device UE B (e.g., the user device 12b), but UE B is not in UE A's discovery range. However, a relay user device UE Relay (e.g., the user device 12y) is in communication range of both UE A and UE B. At a first step 112, UE A sends a request to UE Relay to act as a D2D relay with UE B. If UE A does not already have the public key associated with UE B, then this can also be requested in the step 112. At a step 114, this request is forwarded by UE Relay to UE B. At a step 116, UE B responds to UE Relay with its public key, which is forwarded via UE Relay to UE A at a step 118. At a step 120, UE A sends its public key to UE Relay, which forwards the public key of UE A to UE B in a step 122.

After UE A and UE B have each other's public keys, UE A and UE B can apply authentication in accordance with the method 80 for establishing end-to-end secure D2D communication. Even though UE Relay is an intermediary the receives all data sent between UE A and UE B, and has the public keys associated with both UE A and UE B, UE Relay can neither decrypt a message that is encrypted by either of these public key, nor forge any digital signature, because it does not have the private keys associated with UE A or UE B. After the establishment of this end-to-end secure D2D communication, UE A and UE B can agree on a common symmetric secret key, as described above, which is not public to UE Relay. Note that this case is different from the relay-assisted partial-coverage embodiment described above because the UE Relay here does not have radio access to the base station, thus could not request the public keys from the key server module 24. However, this method 110 may nevertheless be instructive of and generally applicable to partial-coverage embodiments, particularly if the public keys in partial-coverage scenarios are not desired or able to be retrieved from the key server module 24.

Figure 10:
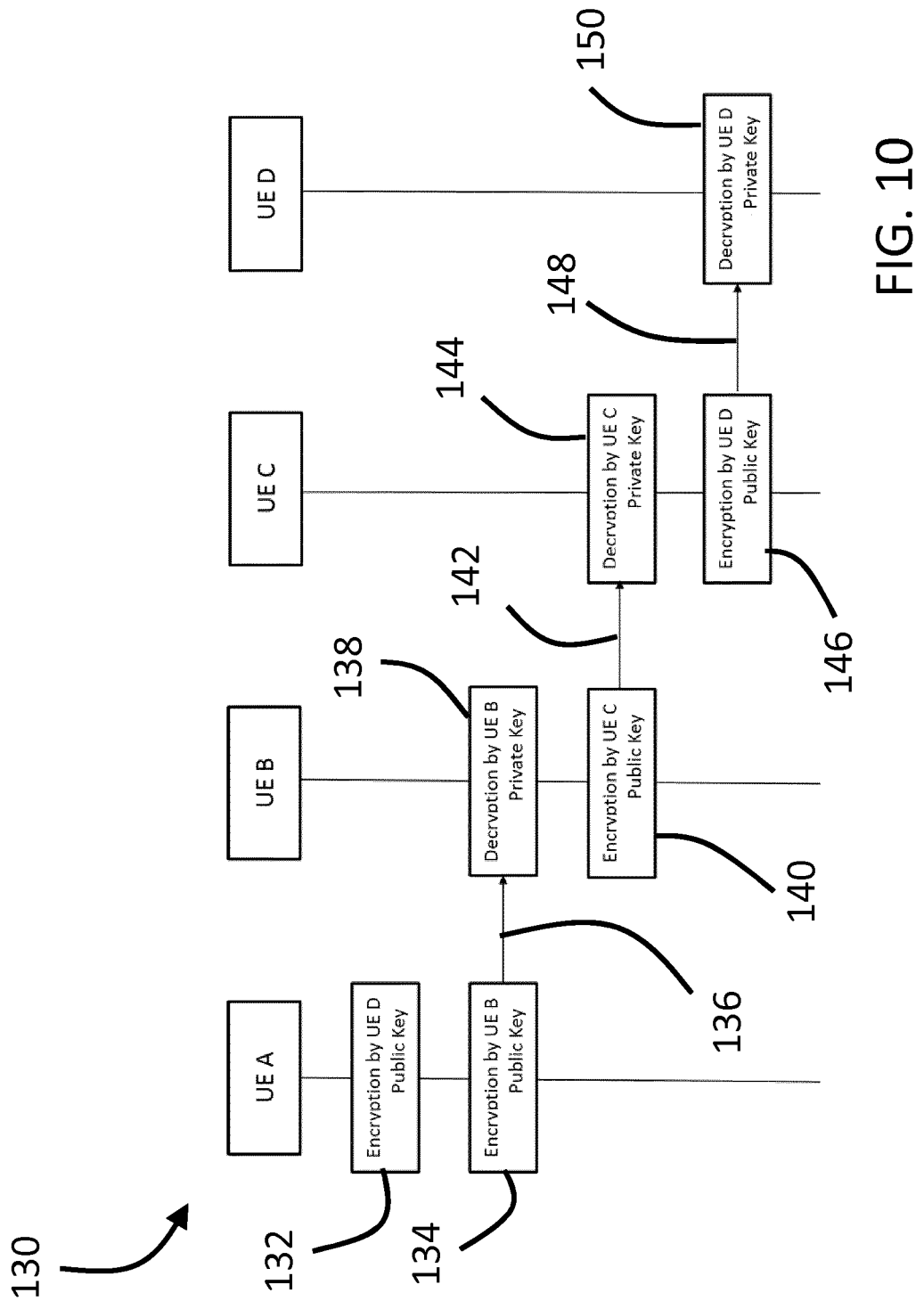
FIG. 10 schematically illustrates a method of using multiple relay user devices to facilitate indirect D2D communication in a communication system, such as the system of FIG. 2, in a multi-hop scenario.

So-called "multi-hop" scenarios present an increased security risk because the data transmission must occur through a chain of two or more relay user devices. A method 130 of secure authenticated D2D in a multi-hop scenario is illustrated in FIG. 10, in which a first (sender) user device UE A (e.g., the user device 12a), desires to communicate with a second (recipient) user device UE D (e.g., the user device 12b), via a multiple D2D relay hops provided by two relay user devices designated as UE B and UE C (e.g., each being implemented as and/or resembling the relay user device 12y). While UE A is not directly reachable to UE D, the method 130 enables the D2D communication links between UE A and UE B, between UE B and UE C, and between UE C and UE D to be secured.

First, it is assumed that UE A and UE D have or obtain each other's public keys, e.g., each other's keys are known and stored in memory from previous communication between UE A and UE D, or from any of the processes described herein. At first step 132, UE A can encrypt the data to UE D by UE D's public key to ensure that it remains secure when being relayed by UE B and UE C, since only UE D can unencrypt this with its private key. In order to ensure that the intended relay user device, i.e., UE B, receives and forwards the transmission, the single-encrypted data can next be encrypted again at a step 134 using the public key of the relay UE B. The double-encrypted data is then transmitted to UE B at a step 136.

UE B authenticates itself by decrypting the first layer of the double-encryption using its private key at a step 138. UE B then encrypts the data (which is now again only encrypted by the public key of UE D) using the public key of UE C at a step 140, since UE C is the next relay in the multi-hop process. The double-encrypted data package is then transmitted to UE C at a step 142 and UE C repeats authentication and verification of itself by decrypting the first layer of encryption using its private key at a step 144.

Since the data after the step 144 is still already encrypted with the public key of UE D, it can either be double-encrypted with the public key of UE D at a step 146 and then transmitted to UE D at a step 148, or sent without double-encryption by skipping the step 146. It can be advantageous in some embodiments to require the step 146 to be performed. For example, in this way, UE B and UE C may not need to "know" that UE D is the intended recipient. Instead, each relay user device is instructed (e.g., in instructions that were decrypted by that relay user device's public key) to simply encrypt the data with the public key of the next user device in the chain, but the relay user devices do not know whether the next user device is the recipient or just another relay. For this same reason, each relay user device may also not be aware that UE A is the original sender. This adds an additional level of protection to D2D communications because it is unclear to the relay user devices who is sending and receiving the data.

UE D receives the package and decrypts once or twice (depending on whether or not the step 146 was skipped) with its private key at the step 150 to retrieve the original data sent by UE A. UE D can communicate back to UE A using the reverse multi-hop route from UE D to UE C to UE B and finally to UE A.

With the method 130 establishing an end-to-end secure D2D route between UE A and UE D, an authentication according to the method 80, but relayed via UE B and UE C, can be implemented between UE A and UE D. Similarly, a common symmetric key can be negotiated between UE A and UE D using the method 130 to simplify authentication and verification at each entity. Even if a symmetric secret key is implemented, the public keys of the relay user devices UE B and UE C can continue to be used if desired, or a different symmetric secret key created for each relay "hop" in the chain between UE A and UE D. These multi-hops can be extended to larger scales by using the type of double-encrypted D2D communication links described with respect to the method 130, and thus are advantageously applicable to many networks and situations regardless of size or configuration.

In one embodiment, geolocation may be utilized in assisting the identification of suitable user devices to be used as relays in multi-hop scenarios. For example, if the sender user device is aware of a "last-known" or "likely" physical address of the receiving user device (e.g., utilizing GPS or other geolocating technology), it can select a first relay device that identifies itself as being closer to the last-known address of the receiving user device. The first relay device and each subsequent relay user device can continue selecting relays in this manner until the recipient user device is located. Additionally, if a relay user device is on a reputable or trusted network (e.g., is within network coverage of a base station), that relay user device may select the base station as a relay in order to facilitate in the identification and communication with between the sender user device and the recipient user device. For example, if a base station is used as a relay, it can more easily scan a wider area for the desired recipient user device and/or identify more reputable and trustworthy user devices to be used as relays, e.g., based on historical events tracked by the base stations.

In one embodiment, the D2D communication system, e.g., the communication system 10, is arranged to discriminate between differential security levels for the private and public keys. For example, the key server module 24 is arranged in one embodiment to categorize differential security into certain levels, for example, a low security "public-to-all" level in which messages are intended to be publically broadcast, e.g., public safety and emergency responses, a medium security "private-to-friends" level for sharing personal information with a select group of trusted devices, and a high security "private-to-none" level which is arranged to strictly guard against privacy leakage of any kind. Each category may have a field associated with the corresponding key or keys and specify a set of programs or applications on the user device that can apply the key(s). A user device can register a pair of public and private keys for each category or security level. By adding this field to the keys, a level of privacy can be set for any of the keys and is thus applicable to all aforementioned embodiments, so that the tiered or differential protection of privacy can be achieved in D2D communications.

Figure 11:
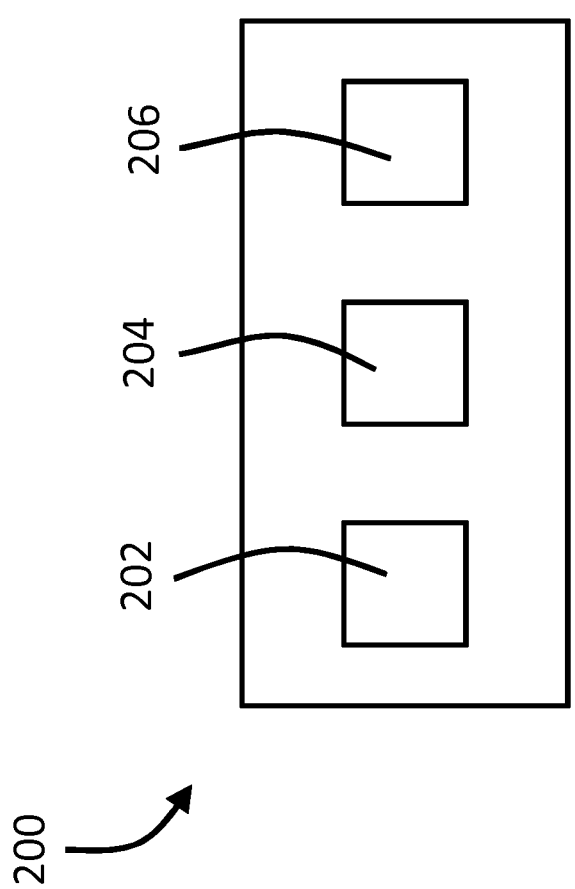
FIG. 11 schematically illustrates a computerized device that can be utilized as, with, or for, many of the components and/or embodiments disclosed herein.

It is to be appreciated that the various functionality and method steps discussed herein are intended to be implemented by computerized systems in the form of a combination of hardware and/or software. By software, it is meant any type of instructions or programming code for execution by the hardware. For example a computerized device 200 is illustrated in FIG. 11, which includes a processor 202 programmed using software to perform various functions discussed herein, and can be utilized in combination with a memory 204. The memory 204 can store data, including the public and private keys disclosed herein, the data transmitted in D2D communications as disclosed herein, and/or software programs for execution by the processor 202, as well as various types of other data or instructions that enable or assist in the operation of the computerized device 200. The computerized device 200 also includes a network interface 206, which may be a transceiver, receiver, transceiver, or other radio device that enables wireless (and/or wired) communication with other devices operating via the same communication protocols, standards, or technology, e.g., LTE or other cellular communication technologies.

It is to be understood that the user devices (i.e., the user devices 12, UE A, UE B, UE1-UE4, etc.), the base stations and network infrastructure (e.g., the base stations 16, eNB, etc.), may be implemented as, in accordance with, or to include, one or more of the computerized devices 200. Accordingly, the communication links and interfaces disclosed herein, e.g., communication links/interfaces 15, 22, 28, 29, PC1, PC2, PC3, PC5, etc. may be established or implemented via the network interface 206. Likewise, the proximity service applications 14 and the key application modules 18 may accordingly be, or include, software that is executed to by instances of the computer devices 200. Similarly, the proximity server function 26, the proximity service application server 20, and the key server module 24 may be, or include, one or more of the computerized devices 200 and associated software executed by the computerized devices 200 in accordance to the methods and embodiments disclosed herein.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of conducting end-to-end secure device-to-device (D2D) communication between a plurality of user devices that includes a sender user device, a recipient user device, and a plurality of relay user devices, comprising the steps of:
   providing a public key and a private key for each of the user devices, the private key for each user device arranged to decrypt data encrypted by the public key corresponding to that private key;
   creating, by the sender user device, a digital signature using its private key; double-encrypting, by the sender user device, a data transmission using the public key of the recipient user device and the public key of a first one of the relay user devices, the data transmission including the digital signature;
   transmitting the data transmission in a chain from the sender user device to the recipient user device through the plurality of relay user devices starting with the first one of the relay user devices, wherein, for each of the relay user devices, the step of transmitting includes:
   receiving the data transmission;
   decrypting a first layer of encryption of the data transmission with its private key;
   encrypting the data transmission with the public key of a subsequent one of the user devices in the chain; and
   forwarding the data transmission to the subsequent one of the user devices;
   authenticating, by the recipient user device, the digital signature of the sender user device using the public key of the sender user device;
   conducting D2D communications between the sender user device and the recipient user device if the digital signature is authenticated;
   providing a wireless communication network with a base station;
   registering the user devices with a proximity service application server when the user devices are in communication with the proximity service application server over the wireless network; and
   managing the public keys, the private keys, or both with a key server module in communication with the proximity service application server at least by not storing the private keys if the private keys are stored by the key server module.

2. The method of claim 1, wherein the step of managing includes generating the public keys, generating the private keys, or both.

3. The method of claim 1, wherein the step of managing includes storing the public keys in memory and providing the public keys to the user devices or the proximity service application server upon request.

4. The method of claim 1, wherein at least one of the user devices is not connected to the wireless network during the step of transmitting.

5. The method of claim 4, wherein none of the user devices are connected to the wireless network during the step of transmitting.

6. The method of claim 1, wherein at least one of the user devices is associated with a plurality of pairs of the public and private keys, each pair associated with a different level of desired security.

7. The method of claim 6, wherein the different levels of desired security are associated with different applications installed on the user device, with different intended recipients of the transmitted data, or a combination including at least one of the foregoing.

8. The method of claim 1, the step of conducting further comprising: negotiating, with the sender and recipient user devices, a symmetric secret key that is less complex than the public keys of the sender and recipient user devices for reducing computational power required to decrypt the D2D communication.

9. A system for enabling end-to-end secure device-to-device (D2D) communication, comprising:
   a plurality of user devices that includes a sender user device, a recipient user device, and a plurality of relay user devices, each user device having:
   a proximity service application configured to detect others of the user devices and to enable D2D communications between the user devices; and
   a key application module in communication with the proximity service application and configured to manage a public key and a private key for each user device, the private key for each user device arranged to decrypt data encrypted by the public key corresponding to that private key;
   a base station configured to produce a wireless network for the plurality of user devices;
   a proximity service application server configured to register user devices connected to the wireless network; and
   a key server module in communication with the proximity service application server and configured to manage the public keys, the private keys, or both, at least by not storing the private keys if the private keys are stored by the key server module;

wherein the user devices are configured to enable D2D communication between the sender user device and the recipient user device via a chain that includes the plurality of relay user devices;

wherein the sender user device is configured to double-encrypt a data transmission with the public key of the recipient user device and with the public key of a first one of the relay user devices, the data transmission including the digital signature of the sender user device, wherein each relay user device is configured to: decrypt a first layer of encryption from the data transmission using its private key when the data transmission is received, encrypt the data transmission with the public key of a subsequent one of the user devices in the chain, and forward the data transmission to the subsequent one of the user devices in the chain, and wherein the recipient user device configured to decrypt the data transmission using its private key and to verify authenticity of the digital signature using the public key of the sender user device.

10. The system of claim 9, wherein the user devices are mobile communication devices communicating over a cellular communication network.

11. The system of claim 9, wherein the key application modules are arranged to generate the public and private keys.

12. The system of claim 9, wherein each user device is associated with a plurality of pairs of the public and private keys, each pair associated with a different level of desired security.

13. The system of claim 9, wherein at least one of the user devices is not in communication with the base station.

* * * * *